Dec. 1, 1970   J. H. BARTRAM   3,543,494
FRUIT PICKER
Filed June 8, 1967   3 Sheets-Sheet 1
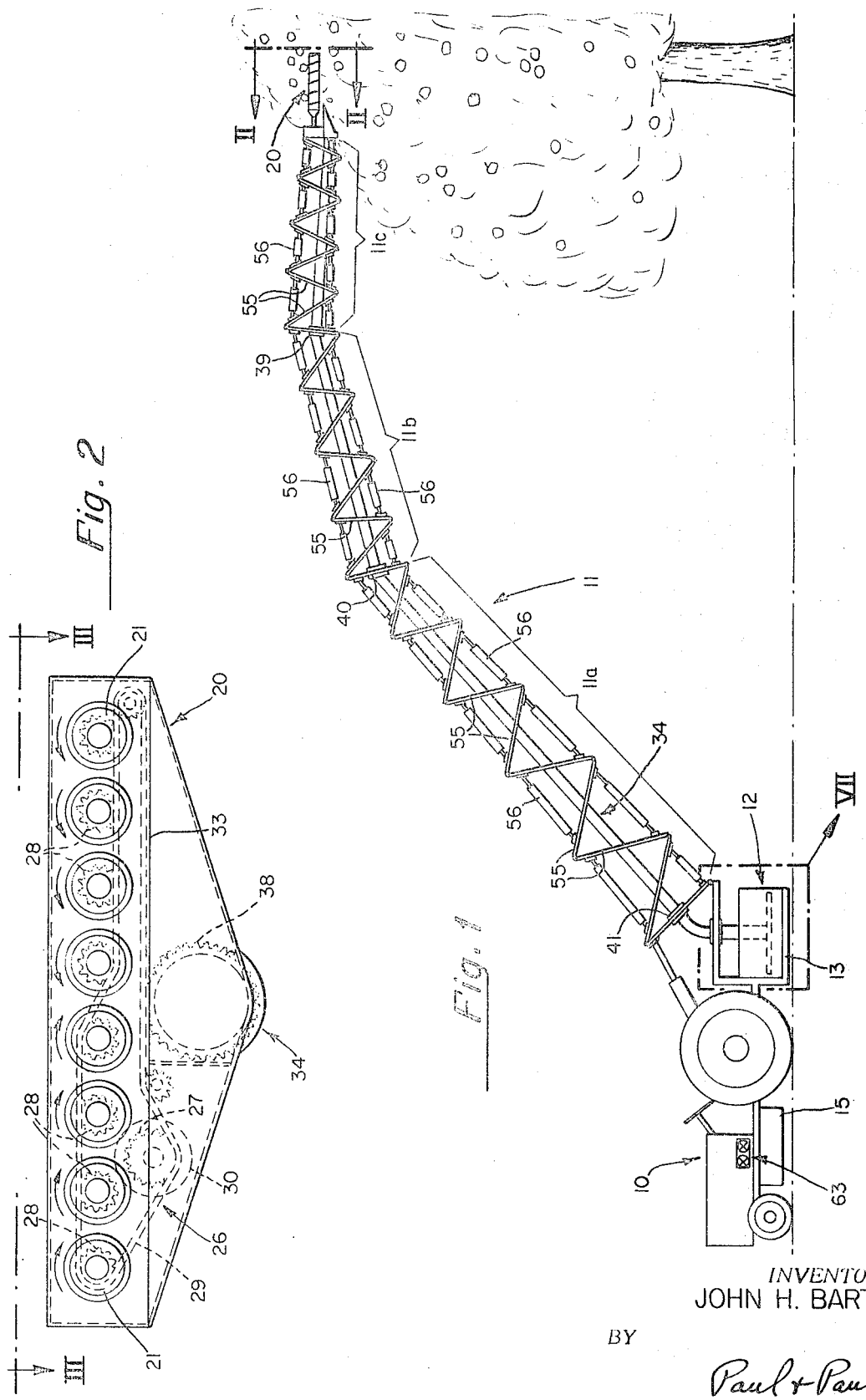
INVENTOR.
JOHN H. BARTRAM
BY
Paul & Paul
ATTORNEYS.

Dec. 1, 1970 J. H. BARTRAM 3,543,494
FRUIT PICKER

Filed June 8, 1967 3 Sheets-Sheet 2

INVENTOR.
JOHN H. BARTRAM
BY
Paul & Paul
ATTORNEYS.

Dec. 1, 1970   J. H. BARTRAM   3,543,494
FRUIT PICKER

Filed June 8, 1967   3 Sheets-Sheet 3

INVENTOR.
JOHN H. BARTRAM

BY

*Paul & Paul*
ATTORNEYS.

United States Patent Office 3,543,494
Patented Dec. 1, 1970

3,543,494
FRUIT PICKER
John H. Bartram, 103 Bartram Lane,
West Chester, Pa. 19380
Filed June 8, 1967, Ser. No. 644,553
Int. Cl. A01g *19/08*
U.S. Cl. 56—328                     9 Claims

ABSTRACT OF THE DISCLOSURE

A plurality of closely spaced cylindrical picking fingers having helical rubber ridges thereon and disposed in generally parallel relationship are cantilevered from a drive means for rotating said fingers about their axes. The drive means is attached to a mobile boom for positioning the fingers in a fruit tree to remove the fruit. Once the fruit is removed, it travels down the fingers to a fruit retrieval belt along which it travels to a receiver. Both the fingers, the belt, and the receiver are designed to handle the fruit gently to avoid bruising it.

BACKGROUND OF THE INVENTION

This invention relates to mobile automatic fruit pickers, and more particularly, to novel picking fingers having helical resilient ridges thereon for removing the fruit, in combination with a drive means preferably disposed on a flexible controllable boom, which includes means for retrieving the fruit. The fruit retrieval means coact with a mechanism for depositing the fruit in a container for ease in transportation.

In the prior art, mobile means have been developed for automatically picking fruit from trees. These means include apparatus with a plurality of spaced apart picking fingers, as for instance, the apparatus shown in U.S. Pat. 3,040,507 to F. D. Lasswell, Jr., issued June 26, 1962.

In the referenced patent, a group of rotatable spindles are arranged in parallel relation, each to rotate about its own axis. Upon each spindle there is mounted a picker head secured for rotation with the spindle. The picker heads are characterized by laterally extending paddle elements having equally spaced apart radial wings.

While this type of mechanism may be suitable for the removal of citrus fruits, its application to thin skinned fruits is questionable. Fruits such as apples and pears, bruise easily. In the picking of apples great care must be taken to remove the fruit without bruising it, and to leave the stem intact on the apple.

SUMMARY OF THE INVENTION

The present invention provides a means for automatically picking fruit and retrieving it in good condition. The apparatus comprises a plurality of rotatable fruit picking fingers closely spaced longitudinally so as to support and transport the picked fruit. In the preferred embodiment, each finger has a resilient helical ridge on the surface thereof, such that the lands between the ridges are larger than the expected fruit size. The apparatus functions to remove the fruit, so that the stem breaks at its connection with the branch rather than at its connection with the fruit. The fruit is transported by the fingers and is gently deposited in a conveyor means from which it is conveyed to a receptacle and deposited in accordance with the preferred embodiment of this invention.

Accordingly, it is an object of this invention to provide a mobile fruit picking means for picking thin skinned fruits.

Another object of this invention is to provide an improving picking head for an automatic fruit picker which will gently remove the fruit and retrieve it for collection.

Another object of this invention is to provide in combination a picking head for automatically picking fruits, means for retrieving the picked fruit, and receptacle means including means for gently depositing the fruit in the receptacle from the retrieval means.

BRIEF DESCRIPTION OF THE DRAWINGS

FIG. 1 is a view of the apparatus in accordance with the preferred embodiment of my invention showing a tractor, boom, and picker head in picking position with respect to a fruit tree;

FIG. 2 is a view taken along the line II—II in FIG. 1;

DESCRIPTION OF THE PREFERRED EMBODIMENTS

Figure 3:
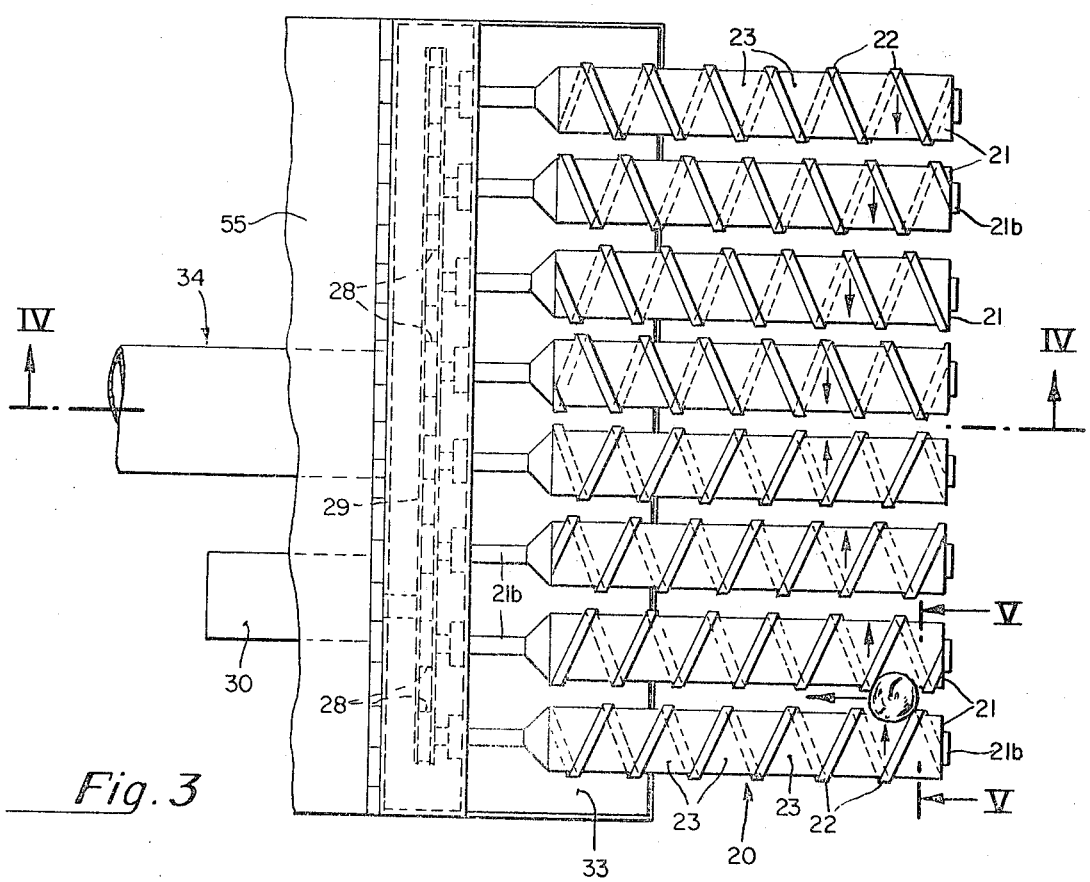
FIG. 3 is a view taken along the line III—III of FIG. 2, showing illustratively a piece of fruit in operative relation to the picking fingers.

Although specific forms of the invention have been selected for illustration in the drawings, and the following description is drawn in specific terms for the purpose of describing these forms of the invention, this description is not intended to limit the scope of the invention which is defined in the appended claims.

Referring to the drawings, FIG. 1 shows the overall combination in accordance with the preferred embodiment of this invention, wherein a tractor designated 10, has a boom designated 11 attached to the back thereof; the boom 11 having a picking head designated 20 at the outer end thereof, and a receptacle 12 at the near end thereof.

Figure 4:
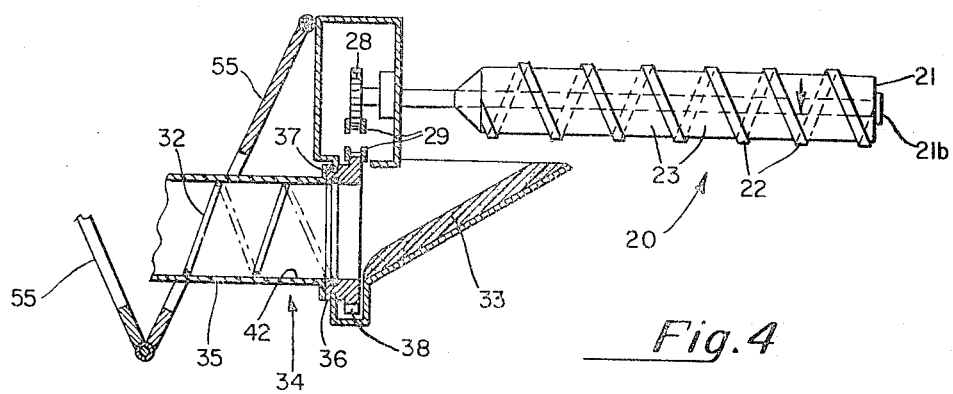
FIG. 4 is a view taken along the line IV—IV of FIG. 3.
Figure 5:
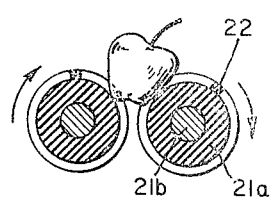
FIG. 5 is a view taken along the line V—V of FIG. 3.

Referring now to FIGS. 2, 3 and 4, the details of the picking head 20 will be described. The picking head 20 comprises a plurality of closely spaced picking fingers 21. Each finger is cylindrical and is preferably composed of a resilient material 21a, such as rubber, mounted about a rigid shaft 21b, as shown in FIG. 5. The outer surface of the finger has a helical ridge 22 thereon.

The ridge is preferably about ½ inch wide and rises above the cylindrical surface of the finger about ¾ of an inch. The lands 23 between the helical ridges are on the order of 5 inches in axial width. The fingers are disposed relatively close together on the order of 1 inch to 2 inches apart at the adjacent periphery, so that the fruit which has been picked will lie between the rotating land surfaces of the adjacent fingers and substantially above the plane of their axes (as shown illustratively in FIG. 5). When the fingers are rotated, the helix will move the fruit downward toward the inner end of the fingers, as shown by the arrow, FIG. 3.

Referring to FIG. 2, a sprocket drive designated 26 is shown for the fingers. A drive gear 27 is connected for rotation to a hydraulic motor 30. The drive gear 27 engages a chain 29 which engages the driven sprockets 28, so that the fingers on either side of the center of the picking head 20 are driven toward one another, as shown by the arrows in FIG. 2.

Spaced closely below the inner end of the fingers is the input end 33 of the retrieval means designated 34. Referring to FIG. 4, it will be noted that the distance which the picked fruit must drop from the fingers to the retrieval means, is on the order of 8 to 10 inches. Fruit traveling backwards along two of the fingers will be dropped onto an inclined padded surface in the input end 33 of the retrieval means 34 and slide or roll down the inclined padded surface to the conveyor 35.

The conveyor 35 comprises a hollow, generally cylindrical tube of a light, flexible material disposed about a helically wound wire 32. The wire gives the conveyor rigidity and limited flexibility. The lead end of the conveyor is fixedly connected to a slip ring 36, which is mounted for rotation in a bearing at 37. The slip ring 36 is formed on the hub of a sprocket gear 38 which is driven by the chain 29 to rotate in the direction of the arrow shown in FIG. 2. In this manner the entire conveyor 35 is rotated.

At the ends of each section of the boom 11, the conveyor 35 is retained in a suitable bearing means as shown at 39, 40 and 41, FIG. 1, to add stability and permit rotation of the conveyor therein. Fruit which rolls down the inclined surface 33, FIG. 4, is deposited on the land 42 and is retained between the wires on the lands and is moved along the conveyor in this manner. Thus, the fruit is gently treated throughout the picking and retrieval operation.

Figure 7:
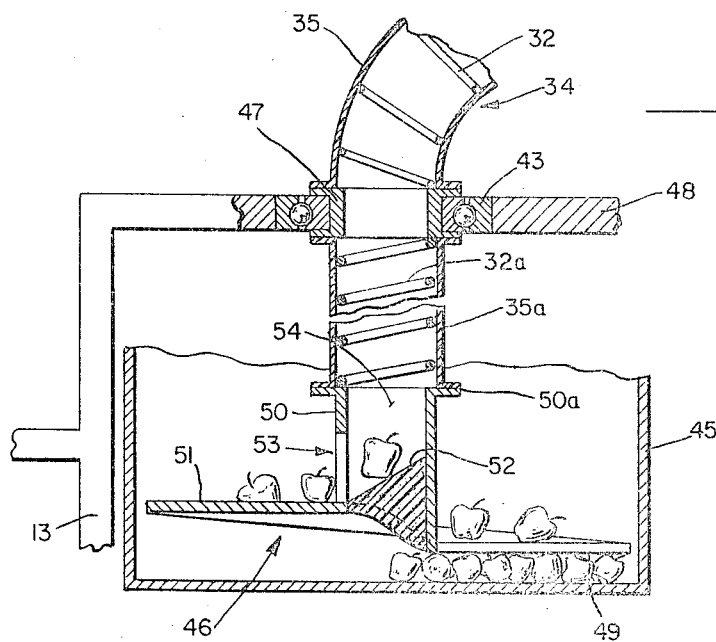
FIG. 7 is an enlarged elevation partially in section and partially broken away of that portion of the apparatus enclosed in the square designated VII, FIG. 1.

The tractor 10, FIG. 1, has a rear deck 13 upon which is disposed a container 45 for the fruit. The container is positioned to receive fruit from the retrieval means 34 which, as seen in greater detail in FIG. 7, includes an auger, designated 46. The conveyor 35 passes through the bearing 41 in the boom 11, and it is fixedly attached at the end thereof in slip ring 47, which is mounted for rotation in bearing 43 in the frame 48. Depending from the slip ring 47, is a short length of conveyor 35a which is composed of a light flexible material and retains a coiled spring 32a. The spring is fixedly connected to the slip ring 47 for rotation with the conveyor 35. The other end of the spring 32a is fixedly connected to a rigid tubular member 50 which forms a part of the auger 46. Disposed about the tubular member 50 and connected as an integral part therewith, is a flat deck 51 composed of a rigid material. The deck is in the form of a single revolution of a helix. Within the tubular member 50 there is a plate 52, having a pad thereon made of a thick resilient material, so that the fruit is not bruised due to its fall from the retrieval conveyor 35, which plate is disposed at an angle to the axis of the tubular member 50 and terminates at the surface of the deck 51 near the top of the helix. A hole designated 53 in the wall of the tubular member 50 communicates the chamber 54 within the tubular member 50, with the area outside of the tubular member at the plate where the padded plate 52 meets the deck 51.

In operation, fruit passing through the conveyor 35 drops through the member 35a and the vertical member 50 and initially strikes the inclined padded plate 52. The fruit slides or rolls down the plate 52, passes through the hole 53, and rolls out onto the deck 51. The auger being affixed to the rotating spring by adaptor 50a, is likewise rotating. The fruit rolls down the helix surface and off the end thereof, onto the bottom of the container 45. As fruit begins to build up on the bottom, the under surface 49 of the auger 46, at the fruit depositing end thereof, rides up on the previously deposited fruit. The spring 32a is under tension and therefore reduces the weight of the auger considerably; slowly reducing its extended length as the auger rises. New fruit is constantly deposited in the wake of the auger and is thus uniformly distributed throughout the barrel, while at the same time being treated gently.

Figure 6:
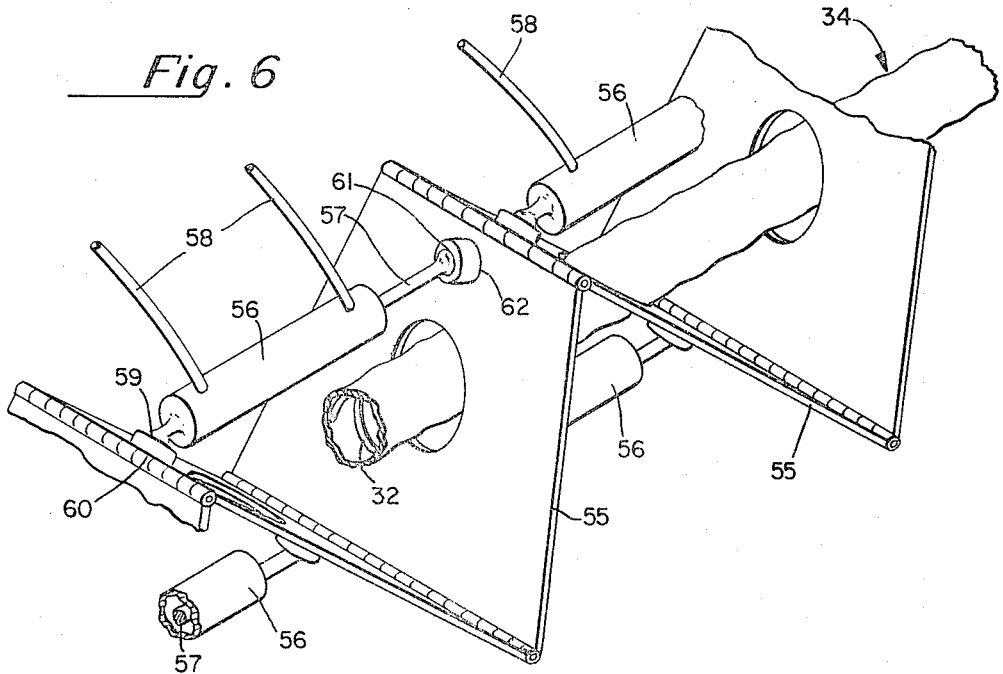
FIG. 6 is a perspective view partially broken away showing in greater detail a portion of the boom shown in FIG. 1.

Referring once again to FIG. 1, the boom designated 11 is constructed of truncated triangular frame sections 55, which are hinged to one another along the top and bottom edges thereof in fan fashion. Between alternate hinged portions (FIG. 6) there are double acting hydraulic cylinders 56. Each cylinder 56 includes a piston disposed therein with a piston rod 57 affixed thereto, said rod extending through the end wall of said cylinder in sliding sealed engagement therewith. The cylinder is supported by means of a ball joint 59 at one end which is fixedly connected to one frame section as at 60, and a similar ball joint 61 at the end of the piston rod which is fixedly connected to the adjacent frame section as at 62. Hydraulic lines 58 from the cylinders are connected to a suitable hydraulic power supply 15, FIG. 1. The cylinders expand and contract according to the flow of fluid in the hydraulic lines 58, which flow is controlled by a set of valves designated 63 at the operator's station. The hydraulic lines for the cylinders within each section (11a, 11b, 11c, FIG. 1) of the boom are interconnected, so that all the cylinders within a given section react uniformly to changes in hydraulic fluid flow in their lines.

As the pistons and cylinders expand and contract, the fan-like sections (11a, 11b, 11c) are extended and contracted axially. Thus, the boom has a great deal of flexibility and can be manuvered easily to position the picker head 20 in various parts of the fruit tree.

In operation, the head is preferably positioned at a slight angle of inclination upward and inserted into the fruit tree beneath a cluster of fruit. The entire head is then raised to lift the fruit slightly. The raising helps to break the stem of the fruit at its juncture with the branch, and coacts with the twisting action imparted to the fruit by the rotating surfaces of the fingers to remove the fruit with the stem intact. This allows an entire cluster of fruit to be removed virtually at one time. The picked fruit then proceeds along the fingers to the inner end thereof where it drops into the input end of the retrieval means. It is then transferred automatically through the conveyor to the container 45 where it is gently deposited and distributed.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice in the United States Patent Office, and is not intended to limit the scope of the invention described and claimed herein.

What is claimed is:
1. A mobile apparatus for picking fruit comprising:
 (a) fruit picking means for automatically removing fruit from a fruit tree;
 (b) a boom connected at one end to said fruit picking means, said boom having adjustable means thereon for positioning said fruit picking means;
 (c) mobile means connected to the other end of said boom for transporting said boom;
 (d) container means disposed on said mobile means to receive and contain said removed fruit; and
 (e) conveyor means disposed on said boom between said picker means and said container means to convey said removed fruit from said fruit picking means to said container means, comprising:
  (1) an input portion disposed beneath said fruit picking means for receiving the removed fruit therefrom;
  (2) a tubular portion connected to said input portion, said tubular portion having rigid helical means therein forming therewith lands and ridges for transporting the removed fruit from said input portion along said tubular portion; and
  (3) means connected to said tubular portion for rotating said tubular portion.
2. An apparatus as in claim 1 wherein: discharge means connected to said tubular portion and disposed in said container means for receiving the fruit which has passed through said tubular portion and depositing it in said container means.

3. An apparatus as in claim 2 wherein said discharge means comprises a tubular member having a chamber therein connected to the tubular portion of said conveyor means, an auger formed about said tubular member, passage means in said tubular member communicating said auger with said chamber, and means disposed in said tubular member and communicating with said passage means for cushioning said fruit upon passage of said fruit from said tubular portion of said conveyor means into said chamber.

4. An apparatus as in claim 2 wherein spring means connected between said tubular portion and said discharge means to reduce the downward force thereof due to the weight thereof.

5. A mobile apparatus for picking fruit comprising:
(a) fruit picking means for automatically removing fruit from a fruit tree;
(b) a boom connected at one end to said fruit picking means, said boom having adjustable means thereon for positioning said fruit picking means, comprising: a plurality of plate members hinged together in fan fashion; a plurality of piston and cylinder means disposed on said boom and connected between said plate members to adjust the angle between said plate members; and means connected to said plurality of piston and cylinder means to control the angle of adjustment;
(c) mobile means connected to the other end of said boom for transporting said boom;
(d) container means disposed on said mobile means to receive and contain said removed fruit; and
(e) conveyor means disposed on said boom between said picker means and said container means to convey said removed fruit from said fruit picking means to said container means.

6. An apparatus for picking and retrieving fruit, comprising:
(a) fruit picking means for automatically removing fruit from a fruit tree;
(b) a boom connected at one end to said fruit picking means, said boom having adjustable means thereon for positioning said fruit picking means; and
(c) conveyor means disposed on said boom between said fruit picking means and the other end of said boom to convey said removed fruit from said fruit picking means to the other end of said boom, comprising:
(1) an input portion disposed beneath said fruit picking means for receiving the removed fruit therefrom;
(2) a tubular portion connected to said input portion, said tubular portion having rigid helical means therein forming therewith lands and ridges for transporting the removed fruit from said input portion along said tubular portion; and
(3) means connected to said tubular portion for rotating said tubular portion.

7. An apparatus for picking and retrieving fruit, comprising:
(a) fruit picking means for automatically removing fruit from a fruit tree;
(b) a boom connected at one end to said fruit picking means, said boom having adjustable means thereon for positioning said fruit picking means, comprising: a plurality of plate members hinged together in fan fashion; a plurality of piston and cylinder means disposed on said boom and connected between said plate members to adjust the angle between said plate members; and means connected to said plurality of piston and cylinder means to control the angle of adjustment; and
(c) conveyor means disposed on said boom between said fruit picking means and the other end of said boom to convey said removed fruit from said fruit picking means to the other end of said boom.

8. An apparatus for picking and retrieving fruit, comprising:
(a) fruit picking means for automatically removing fruit from a fruit tree;
(b) a boom connected at one end to said fruit picking means, said boom having adjustable means thereon for positioning said fruit picking means;
(c) conveyor means disposed on said boom between said fruit picking means and the other end of said boom to convey said removed fruit from said fruit picking means to the other end of said boom; and
(d) a tubular member connected to the other end of said conveyor means, having a chamber therein; an auger formed about said tubular member; passage means in said tubular member communicating said auger with said chamber and means disposed in said tubular member and communicating with said passage means for cushioning said fruit upon passage of said fruit through said conveyor means and depositing said fruit upon said auger; and means connected to said conveyor means to rotate said auger.

9. A mobile apparatus for picking fruit comprising:
(a) fruit picking means for automatically removing fruit from a fruit tree;
(b) a boom connected at one end to said fruit picking means, said boom having adjustable means thereon for positioning said fruit picking means;
(c) mobile means connected to the other end of said boom for transporting said boom;
(d) container means disposed on said mobile means to receive and contain said removed fruit;
(e) conveyor means disposed on said boom between said fruit picking means and said container means to convey said removed fruit from said fruit picking means to said container means; and
(f) said fruit picking means comprising: a frame; a plurality of rotatable finger members, each finger member having at least one helical ridge thereon embracing land means for transporting picked fruit; means mounting said rotatable finger members within said frame for rotation about their respective axes; drive means connected to said mounting means for rotating said rotatable members about their respective axes; said finger members being disposed on said frame in substantially parallel and coplanar juxtaposition and spaced from said frame, so that fruit will pass axially along said finger members toward said frame and will pass between said finger members at a point adjacent to said frame; and input means connected to said conveyor means and disposed beneath said finger members to receive the fruit passing between said finger members and transfer it to said conveyor means.

References Cited

UNITED STATES PATENTS

| | | | |
|---|---|---|---|
| 1,976,869 | 10/1934 | Wandscheer | 56—104 XR |
| 2,096,588 | 10/1937 | King | 56—104 XR |
| 2,678,526 | 5/1954 | Voss | 56—104 |
| 2,131,672 | 9/1938 | Rich | 56—328 |
| 2,650,464 | 9/1953 | Bernheim | 56—328 |
| 2,925,162 | 2/1960 | DeTuncq | 193—7 |
| 3,077,720 | 2/1963 | Grove et al. | 56—328 |
| 3,127,725 | 4/1964 | Richardson | 56—328 |
| 3,194,375 | 7/1965 | Callow | 193—7 |
| 3,329,290 | 7/1967 | Lowery | 214—83.1 |
| 3,401,514 | 9/1968 | Clark | 56—328 |
| 3,404,521 | 10/1968 | Thorn et al. | 56—328 |
| 3,413,787 | 12/1968 | Antwerp et al. | 56—328 |

RUSSELL R. KINSEY, Primary Examiner